United States Patent [19]

Pudney et al.

[11] Patent Number: 5,393,338
[45] Date of Patent: Feb. 28, 1995

[54] CATIONIC COMPOUNDS USEFUL AS DRAINAGE AIDS AND STABILIZERS FOR ROSIN-BASED SIZING AGENTS

[75] Inventors: Ian A. Pudney, Corringham, United Kingdom; Brian M. Stubbs, Sidcup, England; Malcolm J. Welch, Barneveld, Netherlands

[73] Assignee: Hercules Incorporated, Wilmington, Del.

[21] Appl. No.: 998,212

[22] Filed: Dec. 30, 1992

[30] Foreign Application Priority Data

Dec. 31, 1991 [GB] United Kingdom ............. 9127566
Jun. 26, 1992 [GB] United Kingdom ............. 9213604

[51] Int. Cl.$^6$ ................... C08L 93/04; C09D 193/04
[52] U.S. Cl. ................................ 106/238; 162/180
[58] Field of Search ..................... 106/238; 162/180

[56] References Cited

U.S. PATENT DOCUMENTS

| | | | |
|---|---|---|---|
| 3,299,034 | 1/1967 | Nishiura | 106/238 |
| 3,526,524 | 9/1970 | Kulick | 106/238 |
| 4,983,257 | 1/1994 | Schultz et al. | 106/238 |

FOREIGN PATENT DOCUMENTS 2517314 7/1983 France .
2566414 12/1985 France .

*Primary Examiner*—David Brunsman
*Attorney, Agent, or Firm*—Mark D. Kuller; Ivan G. Szanto

[57] ABSTRACT

This invention generally provides a class of novel cationic resin comprised of a cross-linked polyamine having pendant tertiary and/or quaternary amine groups linked to amine groups in said polyamine by a hydrocarbon chain including a hydroxyl group in the $\beta$-position with respect to the polyamine chain. In general, these resins can comprise the reaction product of a polyamine having secondary amine groups, a crosslinking agent, and a cationizing agent having an epoxide group and a tertiary or quaternary amine (quaternary ammonium) group. These cationic resins have been found to be useful for a variety of operations in the manufacture of paper and paperboard, especially as drainage aids and stabilizers for dispersed rosin sizing agents.

24 Claims, No Drawings

CATIONIC COMPOUNDS USEFUL AS DRAINAGE AIDS AND STABILIZERS FOR ROSIN-BASED SIZING AGENTS

BACKGROUND OF THE INVENTION

1. The Field of the Invention

The invention described relates primarily to novel polyamines that are useful in the manufacture of paper and paperboard; more particularly, it relates to a cationic resin comprising a cross-linked polyamine containing secondary amine groups and having pendant from at least some of the secondary amine groups a tertiary or quaternary amine groups. This invention also relates to dispersed fortified rosin sizing agents including these novel polyamines as stabilizers for the dispersion, and to drainage aids incorporating these novel resins.

2. The State of the Art

Paper and related paper products are made from cellulosic fibers. In paper and paperboard processing, present high speed machines generally include a web (i.e., a porous conveyor) moving at speeds on the order of one kilometer per minute. A dilute suspension of cellulosic fibers is furnished and accelerated during application to the web; that is, effectively the "furnish" is sprayed onto the web. After a distance of about 50 m from the spraying operation, a vacuum is applied to the bottom side of the web to drain water from the suspension and produce a wet laid paper sheet. Generally, the solids content of the furnish is 1–4 wt. %, which is increased by dewatering to about 40 wt. %. Thereafter, this wet sheet is dried to form finished paper and paperboard. The water that is drained from this stock dispersion during the formation of the wet laid paper sheet may be recycled to the stock preparation plant for reuse in the preparation of additional quantities of the paper stock dispersion.

Modern paper mills tend to close their water systems in order to lower economic costs and lower environmental contamination by minimizing both the amount of polluted water released from the mill and the make-up fresh water taken into the mill. Additionally, compounds such as fillers, dyes, sizing agents, wet and dry strength-enhancing resins, retention aids, defoamers, and other additives are widely used in manufacturing paper and paperboard. These additives are now typically added to the low solids paper stock dispersion or to various subsequent stages of processing (termed "internal" incorporation of the additive) rather than to the finished product (an "external" addition). The water in such a closed mill system tends to become loaded with cellulose fines and these chemical additives, which soon begin to reduce the rate of dewatering. Chemicals generically termed drainage aids have been developed to accelerate the dewatering of these stock dispersions. While drainage aids may be used in open water systems, their greater utility is found in closed water systems to accelerate dewatering and to speed up the paper machine towards maximizing paper production. The efficiencies of drainage aids vary with the particular type of paper furnish used; the furnish may vary between the extremes of a 100% virgin furnish to a 100% waste paper furnish.

The effects of the various chemical additives on the dewatering process on paper and board machines have been widely investigated. Kartovaara reported in *Zellstoff Paperforschungainst* (SF-00101, Helsinki, Finland) that a nonionic and an anionic polymer such as a polyoxyethylene and a carboxymethyl cellulose (CMC) impair the dewatering of a wet paper web made from secondary and sulphate pulps in wet pressing, whereas cationic polymers, e.g., cationic starch and polyethyleneimine, accelerate the dewatering. However, differential scanning calorimetric measurements indicated that these two cationic polymers work in different ways. The effect of the cationic starch was shown to be retained even at long pressing times indicating that its effect on the change of filtration resistance of the wet paper web is not reduced. The effect of the polyethyleneimine on the wet pressing disappeared with increasing pressing time because its effect is combined with the filtration properties of the wet web.

Cationic starches have been made using different cationizing agents. German OLS (Offenlegungsschrift) 3604796 discloses the use of the following cationizing agents for starch:

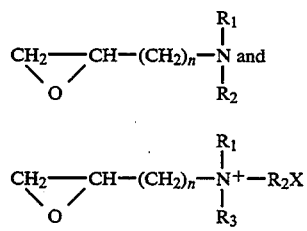

where $R_1$, $R_2$ and $R_3$ are $C_{1-4}$ alkyl, n is 1–3, and X is Cl, Br, AcO (acetate), or sulphate. These cationizing agents have been used also with polyvinyl alcohol (DE 3626662) to yield dry strength additives for paper, and with galactomannans (DE 3604795) to yield other products useful in paper manufacture.

Cationizing agents of a similar type have been used with carboxylate polymers as in EP-A 187,281 to yield cationic water soluble polymers said to be useful as flocculation and filtration agents in paper manufacture. These same cationizing agents have been used with cellulose to form products useful in antistatic paper coatings (JP Kokai 79-87787), with lignosulphonic acid to form emulsifying agents for asphalt (DE OLS 2,218,144), with methacrylyloxypropylammonium salts to form sizing and wet strength agents for paper and textiles (U.S. Pat. No. 3,347,832), and with methacrylamide based polymers to form flocculents and oil well drilling additives (EP-A 156,646).

Polyethyleneimine and derivatives of polyethyleneimine are well known as drainage and retention aids in the manufacture of paper. German OLS 3519357 describes products prepared by the reaction of polyethyleneimine with polyvinyl alcohol and aldehydes.

It is known that drainage and retention aids can be made by crosslinking both polyamines and polyamidoamines. German OLS 1,570,296 discloses products made by crosslinking polyamines with epichlorohydrin. German OLS 1,795,392 discloses products made by reacting polyamidoamines with bifunctional crosslinking agents which are prepared by reacting a bis-tert-amine or a secondary amine with epichlorohydrin. German OLS 2434816 discloses a process for manufacturing paper additives wherein polyamidoamines, to which ethyleneimine is optionally grafted, are reacted with α,ω-dichlorohydrin ethers of polyalkylene oxides (i.e., having chlorine on each end of the molecule).

U.S. Pat. No. 2,926,116 and U.S. Pat. No. 2,926,154 describe a cationic thermosetting polyamide-epichlorohydrin resin and its use as a wet strength enhancer in paper making. The resin is formed by reacting a dicarboxylic acid with a polyalkylene polyamine to produce —NH($C_nH_{2n}$NH)$_x$—CORCO—, wherein n and x are each 2 or more and R is the divalent organic radical of the dicarboxylic acid, and thereafter reacting that polymer with epichlorohydrin. An example of such wet strength resins is one derived from adipic acid and diethylenetriamine, —[—NHCH$_2$CH$_2$—NH—CH$_2$CH$_2$NH—CO—(CH$_2$)$_4$—CO—]$_x$—, and then reacted with epichlorohydrin to produce

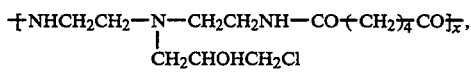

which is then heated to provide a polymer of the form

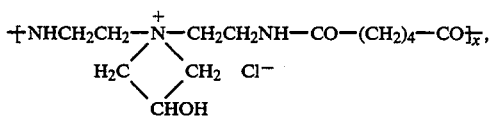

The heterocyclic quaternary amine group is referred to as an azetidinium ring.

The art is thus still concerned with the problem of providing chemical additives which function especially in the neutral to alkaline pH regime for making paper and paperboard. ("Paperboard" is generally considered a lower grade paper product, such as used for making various types of "cardboard".) As noted for closed water systems, additives tend to accumulate in the water, including those additives intended to be incorporated into the paper product but which are not entirely fixed in the wet laid sheet.

Another additive commonly used in the manufacture of paper products is a sizing agent. Sizing is typically accomplished by adding a rosin-based sizing composition at one or more selected points in the paper machine, after which papermaker's alum (aluminum sulfate, or a similar salt) is commonly added to the sheet to precipitate the sizing agent onto the cellulosic fibers. This general technique of using a rosin-based sizing agent and alum has been practiced for many decades. However, the technique operates satisfactorily only at pH values lying between about 4 and 6; there exist cellulose pulps which are difficult to size under these pH conditions.

Another consideration with acid sizing is that paper made under acidic conditions not only develops less dry strength but, over time, the strength of the paper decreases. Yet another consideration in processing in such a system is acid-induced corrosion of the papermaking apparatus. Accumulation of acid is a particular concern with modern plants that recycle the drained water.

To accomplish sizing in a higher pH regime, some artisans have employed reactive sizes, such as alkyl ketene dimer or alkyl succinyl anhydride. Still, there are methods of using rosin-based sizes at more neutral pH conditions.

Rosins used in sizing compositions are usually comprised of wood rosin, gum rosin, tall oil rosin, or some mixture thereof. The rosin may be "fortified" by reaction with, for example, fumaric acid to form the fortified rosin (a Diels-Alder adduct of the original rosin).

U.S. Pat. No. 3,186,900 discloses a sizing composition used in the pH range of 6.0 to 7.5. These sizes comprise a relatively small amount of alum and a preblend of rosin size and a cationic polyamide-epichlorohydrin resin.

British Pat. No. 1,266,829 describes high-free-rosin emulsion sizes having 80–98% of the total solids weight comprising an unsaponified rosin. These sizes are used in the pH regime of 6.0–7.5. The composition also includes a water-soluble cellulose-substantive cationic polyamine, such as polyethylene imine, cationic starches polyvinylamine, polyvinylpyridine, poly(N-methyl pyridinium) chloride, urea-formaldehyde-polyalkylene-polyamine, and aminopolyamide-epichlorohydrin resins.

EP-B-074,544 describes the preparation of fortified rosin dispersions in aqueous media, particularly a mixture of two dispersions based respectively on rosin and alkyl ketene dimer.

EP-292,975 discloses a cationic rosin size particularly for increasing the resistance to penetration of liquid packaging board by aggressive penetrants through ingress at the edges of the packaging board.

EP-208,667 discloses the use of a cationic surfactant in the preparation of rosin and synthetic size mixtures which are described as having a lower softening point than the original rosin, and so taught as spreading better on the fibers.

EP-A-333,368 discloses a method for sizing paper at a neutral or alkaline pH with rosin, an aluminum compound, and a cationic or anionic polyelectrolyte. The method comprises preparing and applying a preblend of the size just prior to use.

There are numerous examples of stable rosin dispersions using anionic or nonionic surfactants, whereby the fixation of the hydrophobic rosin size to the pulp fibers is augmented by the concomitant use of cationic polymers, such as starch, polyamines polyamide epihalohydrin polymers, and cationized polyacrylamides. Exemplary compositions are described, for example, in JP 61-113898 and EP 259671.

GB 2,159,183 discloses mixtures of rosin dispersion and aluminum polyhydroxy chloride. These mixtures rely for their cationicity on the formation of a stable flocculent resulting from the reversal of charge in the double layer of the colloidal particles in the dispersion.

JP-A-3294596 discloses a cationic rosin sizing agent emulsified with a polyamide-polyamine epichlorohydrin resin having hydrophobic groups. The sizing agent is used in neutral pH paper manufacturing, and is more particularly synthesized from (a) polyalkylenepolyamines, (b) dicarboxylic acids or derivatives, (c) epichlorohydrin, and at least one hydrophobic group-introducing compound selected from (d-1) monobasic carboxylic acids, their anhydrides, and their ester, (d-2) alkylamines, (d-3) alkyl ketene dimer, (d-4) alkyl- or alkenyl-succinic anhydrides, (d-5) alkylene oxides, (d-6) organic halides, and (d-7) terpenoids and derivatives.

U.S. Pat. No. 4,036,821 describes a process for the production of basic, storage-stable polyaminoamides and retention agents for fillers and pigments, drainage accelerators, and effluent-treating agents in the manufacture of paper. The process essentially comprises (a) reacting a polyfunctional compound (e.g., epichlorohydrin) with a tertiary, monofunctional amine (e.g., e.g., trimethylamine) to form an ammonium compound, and then (b) reacting the ammonium compound with the secondary amino groups in a basic polyaminoamide derived from (i) a dicarboxylic acid, (ii) a polyalkylenepolyamine, and (iii) an amino carboxylic acid or a lactam.

SUMMARY OF THE INVENTION

The invention comprises an aqueous dispersion comprising rosin particles and a cationic resin comprising a cross-linked polyamine having pendant tertiary and/or quaternary amine groups linked to amine groups in said polyamine by a hydrocarbon chain including a hydroxyl group in the β-position with respect to the polyamine chain.

Thus, in another embodiment this invention provides a novel sizing composition comprising a dispersion of a fortified rosin stabilized with this novel cationic polyamine.

Also provided by this invention is a process for sizing paper by using a rosin dispersion stabilized with a novel cationic polyamine.

DETAILED DESCRIPTION OF THE INVENTION

It has been found that a complex terpolymeric cross-linked polyamine having pendant tertiary and/or quaternary amine groups linked to amine groups in the polyamine by a hydrocarbon chain including a hydroxyl group in the β-position with respect to the polyamine chain have various utilities in the manufacture of paper products. This resin can be produced by reacting a polyamine with a cross-linking agent and a cationizing agent including an epoxide and a tertiary or quaternary amine group. These novel resins are termed "terpolymers" because they are generally derived from three components, and "complex" because the various components can and preferably include oligomers and short chain polymers (as opposed to the basic monomers from which they are derived originally). Further regarding the nomenclature used herein, although organic compounds in which nitrogen has four covalent bonds are typically called quaternary "ammonium salts" (quaternary amine cations with an associated anion), for ease of discussion, and because of the similar utility of the tertiary amines, these compounds are referred to herein as quaternary amines. The hydroxy group in the β-position of the pendant tertiary/quaternary amine (the second carbon from the polyamine chain) comes from the epoxide group of the cationizing agent.

In general, lower molecular weight versions of these resins are useful for enhancing wet strength, whereas higher molecular weight resins are more useful as flocculents and drainage aids. Surprisingly, though, the embodiment identified in the examples as Resin A has a molecular weight lower than typical for drainage aids, yet provides better results than conventional drainage aids. Thus, the novel cationic resins of this invention would be expected to provide even further improvements in drainage when prepared with higher molecular weights.

The polymer of the present invention generally comprises recurring linkages of the structures shown as formulae (I), (II), (III), and (IV):

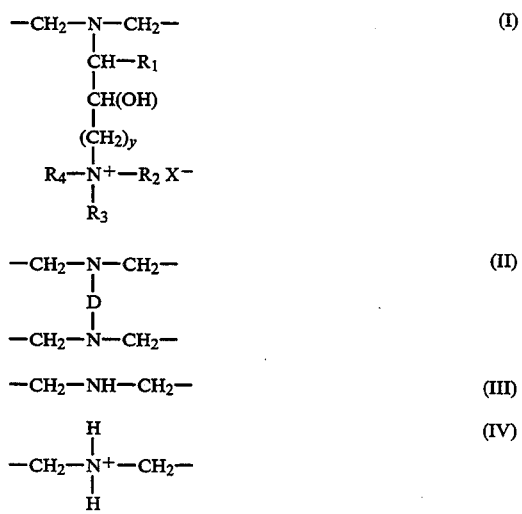

wherein $R_1$ is H or $C_{1-3}$ alkyl; $R_2$, $R_3$, and $R_4$ are $C_{1-8}$ alkyl; $X^-$ is an anion (e.g., $Cl^-$, $Br^-$, $CH_3COO^-$ (acetate), $HSO_4^-$ (sulfate), and the like): y is 1–3; and D is a covalent bridge introduced by the reaction of a polyfunctional crosslinking agent with two secondary amine groups of the polyamine (Reactant I). These polyalkylene polyamines are preferably and practically devoid of such compounds as identified by formulae (V) and (VI):

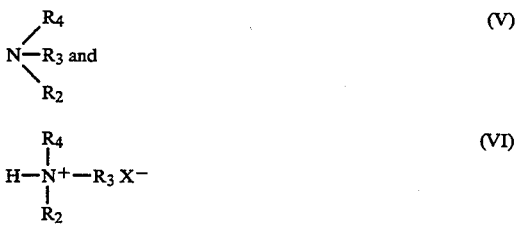

Any water-soluble polymer that contains a secondary amine group in its recurring unit (either pendant or in the backbone) is suitable as Reactant I of the present invention. Examples of such polyamines are synthetic materials such as polyalkylene polyamines, polyamidoamines, poly(diallylamine) and derivatives thereof, and modifications of such polymers with compounds or polymers containing urea, amine, imine, epoxide, acrylate, carboxylate, unsaturated acids, and other groups effective for reacting with the polyamine and which leave the secondary amine groups in the polyamine available for crosslinking.

Suitable polyalkylene polyamines include polyethylene polyamines, polypropylene polyamines, polybutylene polyamines and bishexamethylene triamine of general formula (VII):

$$H_N-(C_nH_{2n}-NH)_m-C_nH_{2n}NH_2 \quad (VII)$$

where n is an integer from 2–6 and where m is an integer from 1–8, preferably 1–4. Blends of such polyalkylene polyamines and crude commercial grades of such materials may also be employed. Specific examples of polyalkylene polyamines include diethylenetriamine (DETA), triethylenetetramine (TETA), tetraethylenepentamine, dipropylenetriamine, dibutylenetriamine, and dihexylenetriamine.

Suitable polyamidoamines can be prepared by reacting a dicarboxylic acid, or a mono- or di-$C_{1-4}$ ester thereof, with a polyalkylene polyamine. The polyamidoamines contemplated for use in the present invention comprise recurring polymer units of formula (VIII):

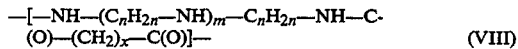

where: n is an integer from 2–6, preferably 2, 3 or 6, and most preferably 2; m is an integer from 1–8, preferably 1 or 2, and most preferably 1; and x is an integer from 1–8, preferably 3–8, and most preferably 4.

Suitable dicarboxylic acids for making polyamidoamines are saturated linear aliphatic acids containing from 3–10 carbon atoms or mixtures thereof; exemplary dicarboxylic acids include succinic, adipic, azelaic, and the like. Alternatively their $C_{1-4}$ mono- or dialkyl esters may be employed.

The polyalkylene polyamines and the dicarboxylic acids (in the case of free acid) are reacted in essentially equimolar proportions under sufficient temperature and duration that nearly all the primary amine groups of the polyalkylene polyamine are acylated and the secondary amine groups remain essentially unreacted. Typical reaction temperatures range from 110° to about 250° C., more preferably between 160°–210°, for this polycondensation reaction. The course of the reaction can be monitored by collecting the water condensate and measuring its mass as an indication of the extent of the reaction.

Various modifications can be made to derive other polyamidoamines. Unsaturated acids, such as itaconic acid, maleic acid, or their anhydrides, can be introduced alone or in combination with the various dicarboxylic acid reactants used. Further, aromatic dicarboxylic acids, such as iso- and terephthalic acids, can be used alone or in combination.

Preferred secondary amine-containing polyamines are the polyethylene polyamines and the polyamidoamines derived from diethylenetriamine (DETA) and adipic or glutaric acids, or their esters, and including the branched derivatives of linear polyamidoamines prepared by sequentially reacting a linear polyamidoamine with an alkyl acrylate or methacrylate and a polyalkylene polyamine. The most preferred secondary amine containing polymers are the polyamidoamines prepared from adipic acid and diethylenetriamine.

Historically with polyalkylene polyamine resins; the principal component is DETA (diethylenetriamine). It is possible to replace part of the polyamine with a diamine to produce a prepolymer having fewer secondary amines available for crosslinking. Materials such as ethylenediamine, caprolactam, and 6-aminocaproic acid are sometimes employed for this purpose, the latter two of which are presently used as components of some wet strength-enhancing resins. A compound such as 6-aminocaproic acid will react with an amine or carboxyl terminus of the polymer to form an amide group and regenerate a similar end group at that terminus: e.g., the 6-amino group reacts with a carboxyl group on the terminus of polyamidoamine to form an amide linkage and regenerate as the carboxyl terminus that of the caproic acid. Accordingly, this technique provides "spacer" units without introducing more secondary amine sites for crosslinking.

Still other dicarboxylic acids can be incorporated into the polymer. These include aminopolycarboxylic acids such as iminodiacetic, nitrilotriacetic acid, and ethylenediaminetetraacetic, as well as bis(carboxymethyl) polyalkylene polyamines. Still further, heterocyclic acids, such as derived from the reaction of amino acids or lactams with an unsaturated acid such as itaconic acid, can be incorporated into the polyamine of Reactant I.

Another type of polyamidoamine contemplated for use in the present invention is prepared by reacting a polyamidoamine made as described above with an alkyl acrylate or methacrylate to produce a polymer with pendant ester moieties, and then to react these ester groups with an alkylene diamine or polyalkylene polyamine as already defined to give pendant aminoamide groups. Such branched polyamidoamines are described in EP 0066366 and have the general formula (IX):

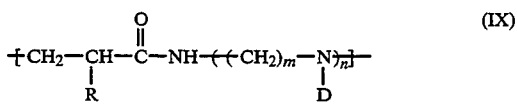

where: R is H or lower alkyl; n is an integer of 1–3; m is an integer of 2–6; D is independently H or formula (IXa)

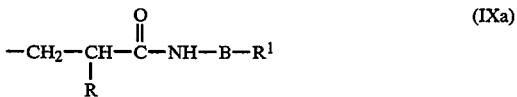

where: R is as defined above; $R^1$ is independently H, $C_{1-4}$ alkyl or $C_{1-4}$ hydroxyalkyl; B is

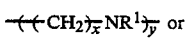 or

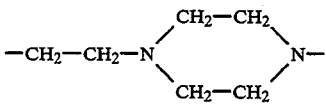

where: x is an integer of 2–10; y is an integer of 1–6; $R^1$ is as defined above; and at least about 10%, preferably at least about 30%, of the D moieties correspond to formula (IXa).

Urea linkages may also be incorporated into the polyamine resin, to provide a polyalkylene polyamine-urea resin. One method for making such a polymer includes reacting a polyalkylene polyamine with excess dicarboxylic acid (e.g., oxalic acid) to form a carboxyl-terminated base polymer, and thereafter reacting with a primary-tertiary amine (e.g., $H_2N(CH_2)_3N(CH_3)_2$) to provide a polyamine having tertiary amine end groups. Preferably thereafter, this resin is reacted with a polyalkylene glycol dihalide, whereby in the resulting polymer the tertiary amine end groups are converted to quaternary amine groups having an associated halide ion, while the secondary amine groups of the base polyalkylene polyamine remain essentially unreacted.

Another category of polyalkylene polyamines useful for this invention comprise poly(diallylamine) resins. These are typically produced by free radical-initiated polymerization of diallylamine acid salts to provide a polyamine having secondary amine groups. Analogously, alkyldiallylamines (e.g., poly(methyldiallylamine)) and derivatives thereof (e.g., poly(N-cyanoethyldiallylamine)) can also be prepared by known techniques.

Still another type of polyamine useful in this invention can be made by reacting an acrylamide with a polyalkylene polyamine to form a tertiary amino-bisamide having secondary amine groups. Other useful polyamines can be formed by transaminating a polyacrylamide with an amine such as ethylenediamine or a polyalkylene polyamine, or by amidating a polyalkylacrylate such as poly(ethyl acrylate) with an amine such as triethylenetetraamine.

It is thus seen that the scope of Reactant I, the polyalkylene polyamine, is quite broad. Nevertheless, the essential aspect of Reactant I, however modified, is that it contain secondary amine groups available for crosslinking.

Crosslinking agents, defined now as Reactant II, are polyfunctional compounds in the sense that each molecule contains at least two reactive sites for reaction with at least two secondary amine groups present in Reactant I. It is has been variously practiced to modify particular polyalkylene polyamine resins with a crosslinking agent, typically epichlorohydrin. Examples of Reactant II according to this invention include: $\alpha,\omega$-alkane dihalides having 2-8 carbon atoms, such as 1,2-dichloroethane, 1,3-dichloropropane, and 1,6-dibromohexane; $\omega,\omega'$-dihalogenoethers having 2-8 carbon atoms, such as bis(2-chloroethyl)ether and bis(4-chlorobutyl)ether; halohydrins and epihalohydrins having 3-8 carbon atoms, such as 1,3-dichloro-2-propanol and epichlorohydrin, which has the structural formula

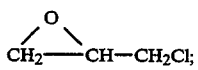

bis-epoxide compounds having 4-22 carbon atoms, such as 1,4-butanediol diglycidyl ether, 1,2,3,4-diepoxybutane, 2,2-bis(4-hydroxphenyl)propane diglycidyl ether, and diglycidylethers of polyalkylene oxides such as polyethylene oxides; unsaturated compounds having between 4 and 20 carbon atoms and at least two ethylenically unsaturated, mutually non-conjugated double bonds for participating in crosslinking, including vinyl compounds (e.g., divinyl ether, divinyl sulfone, and methylene-bis-acrylamide), trifuntional compounds (e.g., glycerol triacrylate and N,N',N''-triacryloyl-hexahydro-s-triazine), and tetrafunctional compounds (such as pentaerythritol tetraacrylate); sulfonic acid esters of alkanediols wherein the alkanediols have 2-8 carbon atoms, such as ethanediol di-p-toluenesulfonate; and 2-halocarboxylic acid halides, such as chloroacetylchloride and 2-chloropropionyl chloride. It should be noted that the HCl adduct of epichlorohydrin, 1,3-dichloro-2-propanol, will initially produce a polymer having quaternary amines (quaternary ammonium cations with associated anions), which can be modified to provide a polyamine having crosslinked bridges through tertiary amines by treatment with an alkali material. Epichlorohydrin and 1,3-dichloro-2-propanol are interconvertible in solution $H_2O + Cl^- +$

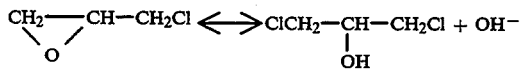

As is evident from this representation of the reaction, the position of the equilibrium is dependent upon the chloride ion content and the pH of the solution.

Preferred polyfunctional crosslinking agents are the $\alpha,\omega$-alkane dihalides, epihalohydrins, bis-epoxy compounds, and sulfonic acid esters of $\alpha,\omega$-alkane diols. Particularly preferred crosslinking agents are the bifunctional compounds, such as 1,2-dichloroethane, epichlorohydrin, 1,4-butanediol diglycidyl ether, and 1,4-butanediol di-p-toluenesulfonate.

Various cross-linked resins can be formed using these crosslinking agents, and in general the resulting polymer has some linkages of type II as shown above. However, other modifications of the polyalkylene polyamine can also be effected. For example, as described above for the production of a polyalkylene polyamine-urea, a polymer having tertiary amine units can be made. These tertiary amine groups can react with the epoxide moiety of epichlorohydrin to produce a polymer having an epoxide quaternary amine moiety.

Taking the poly(diallylamine) resins noted above, when crosslinked with epihalohydrin (for example) produce an azetidinium-type resin having the general formula:

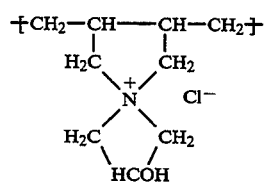

Upon further heating, the azetidinium group can attack another secondary amine group to effect crosslinking.

In practice, the desired polyamine Reactant I is crosslinked using Reactant II and the extent of crosslinking is typically determined, at least qualitatively, by an increase in the viscosity of the reaction mixture. Quantitatively, artisans typically use intrinsic viscosity as a measure of the molecular weight because it is determined independently of the concentration of the polymer. After the resin has reached a desired viscosity, indicating effectively an approximate molecular weight, the crosslinking reaction must be arrested to avoid gelation of the polymer in storage (further crosslinking towards formation of an insoluble, three-dimensional network). The crosslinked polyamine resin is customarily stabilized for storage by dilution and/or acidification to inhibit further crosslinking reactions. The acid salts of any previously unreacted secondary amines are less reactive toward the azetidinium ring than are free amines at higher pHs. Acidification can be accomplished with such mineral acids as hydrochloric and sulfuric. Combinations of weak and strong acids, such as a combination of formic and sulfuric acids, may be used to improve stability by virtue of a buffering action to prevent pH drift. Of course, if the resins are used soon after manufacture there would be little need to stabilize the composition. It is also interesting to note that while it is neither necessary nor desirable (because of its high corrosiveness) to use hydrochloric acid, it can be used under yet more strenuous conditions to open the hydroxyazetidinium groups to tertiary aminochlorohydrins (note the discussion in the Background section on azetidinium ring systems), which are less reactive. The resin can be "reactivated" by treatment with alkali to form the more reactive amino-epoxides. This general scheme is as follows:

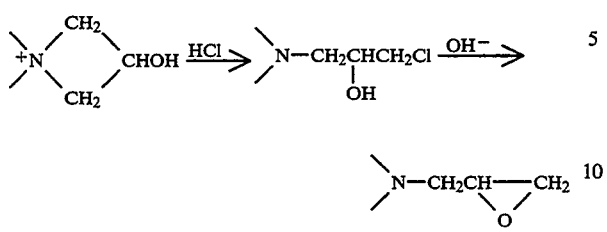

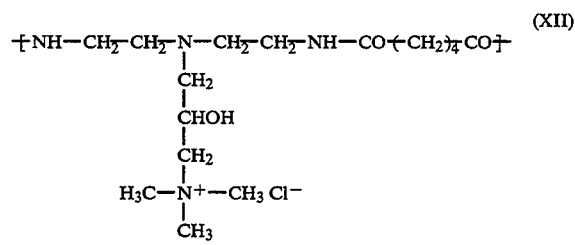 (XII)

Additional methods of stabilizing polyamine-epichlorohydrin reactions products include the use of halogen-free sulfonic acids, as well as the addition of various salts of Mg, Ca, Zn, and Al which coordinate with the polymer.

The crosslinked polyamine is then cationized by using an agent of Reactant III, epoxides having the structures of formulae (X) and (XI):

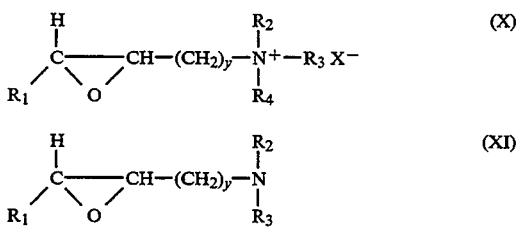

wherein: $R_1$ is H or $C_{1-3}$ alkyl; $X^-$ is an anion (e.g., Cl, Br, AcO, sulphate); $R_2$, $R_3$, and $R_4$ are independently $C_{1-8}$ alkyl; and y is 1-3. Thus, the hydrocarbon chain through which the tertiary or quaternary amine is linked to the polyamine includes 3-5 carbon atoms. Precursors of such epoxides that are capable of forming the oxirane derivative in situ are suitable also. For example, a precursor such as 3-chloro-2-hydroxy propyl trimethylammonium chloride is contemplated for use in this invention; this precursor can be treated with caustic soda to yield the oxirane derivative. The preferred cationizing agents have the general formula (X) above: the most preferred cationizing agent is glycidyltrimethylammonium chloride (GTMAC). Thus, according to this invention, a polyamidoamine can be reacted with GTMAC to give recurring linkages of type I and with epichlorohydrin to give recurring linkages of type II.

In the case where m=1 in formula (VIII), the structural formula of the recurring polymer unit of the product obtained by reacting a polyamidoamine derived from adipic acid and diethylenetriamine with glycidyltrimethyl ammonium chloride is as shown for formula (XII):

The general formula for recurring polymer units obtained by reacting polyamidoamines with a quaternary amine cationizing agent is shown in formula (XIII):

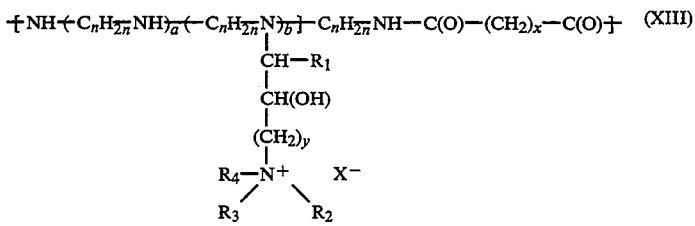 (XIII)

where: n is an integer from 2-6, preferably 2, 3, or 6, and most preferably 2; a and b are integers such that a+b=m of the general formula (VIII) and m is in integer of 1-8, preferably 1 or 2, and most preferably 1; x is an integer of 1-8, preferably 3-8, and most preferably 4; y is an integer of 1-3; $R_1$ is H or $C_{1-3}$ alkyl; $R_2$, $R_3$, and $R_4$ are $C_{1-8}$ alkyl; and $X^-$ is an anion such as chloride, bromide, acetate, sulfate, and the like.

The process for the preparation of the novel cationic resins of this invention is carried out in one or two or three distinct stages, depending upon the reactants used and the particular process chosen. Reactant I may be a polyamidoamine which is formed in Stage 1 by reacting a dicarboxylic acid (or ester) with a polyalkylene polyamine in approximately equimolar ratios. In Stage 2, the polyalkylene polyamine or polyamidoamine formed in Stage 1 is reacted with the crosslinking agent Reactant II to produce water soluble resins of high viscosity and higher molecular weight as compared to the original polymers. It is essential to ensure during this stage that all of the secondary amine groups have not been reacted with the crosslinking agent (at least 1% and at most 99% of the secondary amine groups should be reacted), and that the formation of an irreversibly gelled material is avoided (as noted above regarding stability of the crosslinked polyamine) as the final resin is intended to be water soluble. In Stage 3, the cationizing agent Reactant III is reacted with the residual secondary amine groups of the lightly crosslinked, chain-extended, and branched polyamine as modified in Stage 2. Preferred methods for preparing these cationic resins include reacting about 5-40% of the secondary amine groups during crosslinking, such that 60-95% are available for subsequent reaction with the cationizing agent. Those methods most preferred are where between 75% and 90% of the secondary amine groups remain unreacted during cross-linking and are available for reaction with the cationizing agent.

Although not preferable, the products of this invention may be produced by first cationizing the polyamine Reactant I with Reactant III while leaving sufficient secondary amine groups suitable for subsequent crosslinking with Reactant II. Alternatively, these cationic resin can be made by reacting the polymers containing the secondary amine groups of Reactant I with the crosslinking agent Reactant II and the cationizing agent Reactant III simultaneously with careful control of reactant concentrations, addition rates, and levels consistent with producing polymers of optimum performance.

Drainage Aids

For the production of novel drainage aids using these novel cationic resins, the novel cationic polyamines of this invention can be made with various amounts of both the crosslinking agent and the cationizing agent to yield drainage aids having utility under differing operating conditions. Thus, if the amount of crosslinking agent used is high and the amount of cationizing agent used is low, a highly viscous water soluble polymer of low cationicity is produced. The combined total of the secondary amine groups reacted with Reactants II and III is preferably between 2% and 100%, inclusive.

The drainage aid products of this invention are obtained typically as an aqueous solution, and for commercial use can be diluted to final concentrations suitable in terms of stability and ease of handling (e.g., viscosity of the solution). When used as drainage aids, concentrations of the resin should be about 5–50%, preferably about 10–35% by weight of the aqueous solution.

This portion of the invention will now be described with reference to the following examples, which are meant to illustrate and not to limit the invention to the particular conditions or reactants described.

EXAMPLE 1

Preparation of "Resin A"

This example describes the preparation of a novel cationic polyamine according to this invention which is referred to hereinafter as "Resin A." With reference to formula (XIII), this example describes the preparation of a resin according to formula (XIII) wherein $R_1$ is hydrogen, $y=1$, $R_2=R_3=R_4=-CH_3$, $X^-$ is chloride, $x=4$, $n=1$, and $a=b=1$.

Stage 1

Commercial diethylenetriamine (47.60 parts by weight) was condensed with adipic acid (68.98 parts by weight) at approximately 170° C. for 190 minutes, the water formed being removed by distillation from the reaction mixture. The resulting polymer was then diluted to about 53% solids with water and had an intrinsic viscosity in the range of 0.138±0.008 at 25° C.

Stage 2

One hundred parts by weight of the polymer formed in Stage 1 were blended with 293 parts by weight of deionized dilution water and mixed with 2.6 parts by weight, 0.1 molar equivalents, based on the calculated molecular weight of the recurring polymer unit of epichlorohydrin (which is directly related to the intrinsic viscosity). The reaction mixture was heated for 1–2 hours at 70° C., during which time the viscosity of the solution rose substantially, to yield an epichlorohydrin-modified polymer solution. As such, this reaction stage essentially extends and branches the polymer chains produced in Stage 1, with a minor degree of cross-linking, to produce a modified, partially crosslinked polymer in solution.

Stage 3

To the modified resin in aqueous solution obtained in Stage 2 were added 30.5 parts by weight, 0.8 molar equivalents (based on the calculated content of secondary amino groups in the polyamidoamine obtained in Stage 1), of glycidyltrimethylammonium chloride (GTMAC) in aqueous solution (70% active content). The resulting mixture was heated to 70° C. for 7½ hours to yield a resin which was adjusted to pH 4.5 with 25% sulfuric acid. The resulting resin was then adjusted to 17% total solids with dilution water.

Three batches of the resulting resin, termed hereinafter as "Resin A," were tested as described in Example 2 to determine the characteristics of the resin as a drainage aid for the manufacture of paper and paperboard.

EXAMPLE 1A

Stages 1 and 2 are repeated to produce a partially crosslinked polymer in solution by the method as previously described. To this polymer solution are added 44 parts by weight, 0.8 molar equivalents (based on the calculated content of secondary amine in the polymer resulting from Stage 1 of Example 1), of glycidyl N,N-dimethylcyclohexyl ammonium chloride with stirring while heating at 70° C. for 7½ hours to yield an aqueous solution. The solution is cooled and adjusted to pH 4.5 with 25% sulfuric acid; thereafter, water is added to adjust the solids content to 20% by weight.

EXAMPLE 1B

Stages 1 and 2 are repeated to produce a partially crosslinked polymer in solution by the method as previously described. To this polymer solution are added 43.5 parts by weight, 0.9 molar equivalents (based on the calculated content of secondary amine groups present in the polymer resulting from Stage 1 of Example 1), of glycidyl triethyl ammonium chloride with stirring while heating at 70° C. for 7½ hours to yield an aqueous solution. The solution is cooled and adjusted to pH 4.5 with 25% sulfuric acid; thereafter, water is added to adjust the solids content to 20% by weight.

EXAMPLE 2

An apparatus for assessing the drainage performance of Resin A as produced in Example 1 was constructed of a Hartley filter funnel (12.5 cm dia., fitted with an acrylic plate, and having a capacity of 530 ml) attached to a one liter Buchner flask. This flask was connected by appropriate tubing to a one-half liter Buchner flask which acted as a trap and was equipped with a vacuum gauge calibrated in inches of mercury, a valve to atmosphere, and connection via suitable tubing to a vacuum pump.

Well-mixed paper stock (0.25% solids by weight based on fiber plus filler content) was thoroughly mixed with the drainage aid just prior to testing. The Hartley filter funnel was fitted with dry, pre-weighed filter paper (Whatman 541 12.5 cm dial and the paper was moistened with water. The well-mixed stock (250 ml) was then poured into the funnel, with simultaneous generation of vacuum through closure of the valve, and a timer was started. The maximum vacuum reading was noted on the timer as the stock was vacuum filtered. The timer was stopped when the pulp pad surface first appeared matte, and the time interval recorded. The vacuum would then fall to a lower, stable level which was recorded from the gauge reading. The vacuum pump was then promptly switched off and the filter paper together with the adhering filtered paper solids was removed and promptly weighed, dried in an oven (105° C.), and reweighed.

From these experiments the drainage time, the pressure differential across the filter pad, and the wet pad solids content were derived. The drainage time was determined as the time in seconds between the addition of stock and the appearance of a matte surface on the filter. The pressure differential in inches of mercury was determined between the maximum vacuum during filtration and the lower but stable vacuum level after the appearance of the matte surface. The wet pad solids percentage was determined by dividing the weight of the dry pad by the weight of the wet pad and multiplying by 100% after correcting for the presence of the filter paper. The pad solids (PS %) or dryness can be approximated using the following formula:

$$PS\% = \frac{DP + DFP - DFP}{(WP + WFP) - 2.1 \times DFP} \times 100\%$$

where: DP is the dry weight of the pad; DFP is the dry weight of the filter paper; WP is the wet weight of the pad; and WFP is the wet weight of filter paper.

Three batches of resin of Example 1 were evaluated for drainage performance in this apparatus on paper stock consisting essentially of 70% waste paper and 30% chalk. The pH was approximately 8.5. Polymin SK resin (available from BASF, Ludwigshafen, Germany), believed to be a modified polyethyleneimine, a class of resins typically used as drainage aids, was included for comparison.

The use of a drainage aid should result in a much reduced drainage time (in seconds) which would allow the papermaking machine to be sped up. Ideally, the pressure drop ΔP (in inches of mercury) should be minimized in order to maintain the efficiency of the vacuum couch roll at the wet end of the papermaking machine. The percentage of solids remaining on the filter pad should be as high as possible in order to reduce the drying time of the wet web of paper on the driers of the papermaking machine. Any one, and especially a combination of these advantages, will speed up the process and reduce the energy costs of drying.

A number of batches of Resin A were prepared as described above and tested for drainage characteristics, The drainage aid was added in amounts ranging up to 0.08 wt. % based on the dry weight of the pulp. The viscosity of the resin was measured as a Brookfield viscosity (spindle No. 1 at 25° C.) The results in Table 1 clearly show that the resins of Example 1 exhibit good drainage aid characteristics, especially noted at a pH of 8.5.

TABLE I

| | | Resin A | Resin A Viscosity (mPa·s) | Resin A | Polymin SK |
|---|---|---|---|---|---|
| Drainage Aid (dry basis) | | 49.0 | 54.0 | 77.3 | 500-1000 |
| | | Total Solids % | | | |
| | | 18.1 | 17.3 | 17.5 | 20.0 |
| 0.00 wt. % | Time | 41.4 | 41.4 | 41.4 | 41.4 |
| | ΔP | 6.1 | 6.1 | 6.1 | 6.1 |
| | PS % | 42.0 | 42.0 | 42.0 | 42.0 |
| 0.04 wt. % | Time | 18.6 | 15.4 | 14.8 | 14.8 |
| | ΔP | 11.2 | 14.7 | 14.8 | 14.7 |
| | PS % | 41.0 | 35.4 | 34.3 | 33.5 |
| 0.06 wt. % | Time | 13.2 | 13.5 | 13.0 | 15.4 |
| | ΔP | 15.3 | 14.3 | 15.0 | 15.0 |
| | PS % | 36.6 | 33.9 | 33.7 | 33.2 |
| 0.08 wt. % | Time | 13.5 | 13.5 | 12.8 | 13.5 |
| | ΔP | 15.9 | 14.8 | 14.7 | 16.2 |
| | PS % | 37.2 | 34.2 | 34.3 | 32.9 |

Rosin Dispersions

This invention is also directed to stable dispersions of rosin produced through the use of the novel cationic polyamine resin. We have found that these polyamines are surprisingly efficient stabilizers of dispersed fortified rosin.

The rosin portion of this dispersion can be a conventional rosin, such as any of those commercially available, including wood rosin, gum rosin, and tall oil rosin, and mixtures thereof. Generally, rosin is a hard, brittle polymer which remains after terpenes have been distilled from crude turpentine (plant oleoresins). Rosin is typically treated with formaldehyde for standard sizing compositions in order to inhibit crystallization of the rosin. However, the use of the cationic resin of the present invention obviates the need to treat the rosin to inhibit crystallization.

The rosins used in these novel dispersions are preferably "fortified" by reaction with an $\alpha,\beta$-unsaturated acid or an anhydride thereof. The rosin used in this invention is conveniently prepared from tall oil rosin and reacted with a fortifying agent, such as fumaric acid or maleic anhydride, to an acid/anhydride level of preferably between about 2% and 14% by weight., and more preferably between 6% and 12%.

The dispersion includes a stabilizer or dispersant comprising the novel cationic polyamine as described above. One preferred stabilizer is the polyamidoamine/epichlorohydrin/GTMAC prepared in Example 1 (Resin A). Typically, the stabilizer will be provided in an aqueous solution of pH 4.3-4.8, wherein the resin comprises about one-fifth of the weight of the solution; the Brookfield viscosity of such a solution is generally about 60-80 mPa.s, which allows for uncomplicated use.

The fortified rosin and the cationic polyamine are then processed into a dispersion. Suitable methods of preparing stable cationically-charged rosin dispersions include high shear mixing and inversion.

In the preparation of a dispersion by high shear mixing, the rosin is heated to achieve a viscosity sufficiently low to allow for turbulent mixing to break the rosin into colloidal-sized droplets. For example, tall oil rosin was reacted with fumaric acid to a combined fumaric acid level of 8%. The fortified rosin was heated to 170°–190° C. to achieve a viscosity suitable for shear mixing. The water soluble cationic polyamine is then made into an aqueous solution and mixed with the dispersible fortified rosin. Preferably the mixing is performed under pressure, in two stages, at high shear rate, and followed by droplet size reduction in a pressurized valve homogenizer (e.g., of the Manton Gaulin type).

Alternatively, the rosin can be dissolved in an organic solvent, such as dichloromethane, petroleum distillates, benzene, toluene, etc., and then mixed at conditions of high shear and high turbulence with an aqueous solution of the cationic polyamine. Thereafter, the coarse dispersion is subjected to ultrasonic agitation to further reduce the diameter of the dispersed droplets of rosin. The organic solvent is then removed by evaporation.

After emulsification, the size of the dispersed rosin particles is preferably about one micron; there is essentially no limit (other than economic) to how small the particles may be, a maximum desirable size in the size distribution being generally about six microns, while the average particle size is preferably about one micron. In general, the dispersed rosin particles have an average size of 0.4–2.0 µm (µm=micrometer), more preferably 0.6–1.5 µm. The present invention is beneficially directed to storage stable sizing compositions; that is, compositions which are stable for a period of about one month after being manufactured, preferably more. As the particle size increases, the emulsion becomes unstable with respect to storage: larger particles tend to "precipitate" and settle on the bottom of the storage container, and so the emulsion becomes inhomogeneous. An emulsion with an average particle size of about two microns is generally storage stable for between two and three weeks.

The stable dispersions of this invention can be admixed with alum to produce stable dispersions which are also useful as paper sizing agents. The alum can be in the form of "papermaker's" alum, variously available in slab, granulated, and liquid forms. Mixtures of rosin dispersion and alum can contain alum, in the form of $Al_2O_3$, in the range 0 to 80 parts per hundred of rosin on a dry basis.

The use of quaternary alkylammonium compounds in the polyamine distinguishes the present novel cationic polymer from other materials used to prepare cationic aqueous dispersions of rosin for paper sizing. Sizing efficiency improvements have been shown especially for fortified rosin dispersions stabilized with the novel polyamide, when compared with dispersions of rosin stabilized with commercially available polyamide/epichlorohydrin polymers. While not desirous of being constrained to a particular theory, it is believed that the cationic structure of the novel polyamides enables a higher positive charge to be retained on dispersed rosin particles as the pH becomes more neutral (i.e., moves towards a pH of 7; note Example 16 below). That is, the presence of a tertiary or quaternary nitrogen may stabilize and maintain the cationicity of the polymer as the pH moves from the acidic range into the neutral-to-alkaline regime.

This portion of the invention will now be described with reference to the following examples, which are meant to illustrate and not to limit the invention to the particular conditions or reactants described.

EXAMPLE 3

A rosin adduct was produced from a tall oil rosin by mixing 92 kg of rosin with 8 kg of fumaric acid to obtain a total fumaric acid content of 8% by weight based on the weight of fortified rosin. The rosin adduct was placed in a vessel fitted with a means for heating and melted at 170°–190° C.

An aqueous solution of Resin A was prepared at 4–5% by weight with adjustment to pH 5.0 at room temperature, and preheated to 150° C.

The pressure of the liquid rosin was increased to 7.9 bar and mixed with 275 kg of preheated, pressurized solution of Resin A in a turbulent mixer. The result of this mixing stage was an emulsion having an average dispersed rosin particle size of approximately one micron in diameter. The pressure of the system was raised in rapid stages to 200 bar at an homogenizer valve, and then refined to an average particle size of 0.6 µm by passage of the emulsion through a Manton Gaulin type valve.

EXAMPLE 4

The process described in Example 3 was repeated and modified by adjusting the pH of the aqueous solution of Resin A to 4.7 before it was used.

EXAMPLE 5

The process described in Example 3 was repeated and modified by adjusting the pH of the aqueous solution of Resin A to 5.2 before it was used.

EXAMPLE 6

The process described in Example 3 was repeated and modified by adjusting the pH of the aqueous solution of Resin A to 4 before it was used.

EXAMPLE 7

The process described in Example 3 was repeated and modified by adjusting the pH of the aqueous solution of Resin A to 6 before it was used.

EXAMPLE 8

The process described in Example 3 was repeated and modified by adjusting the pH of the aqueous solution of Resin A to 7 before it was used.

EXAMPLE 9

A 300 g portion of rosin adduct (8% fortification with fumaric acid) was dissolved in 300 g of dichloromethane to prepare a 50% total solids solution.

A 788 g portion of Resin A solution was prepared at a concentration of 4.76% total solids: the pH of the solution was adjusted to 6.0–6.5 with 4M NaOH.

The solutions of rosin and Resin A were blended at low speed in a Waring blender and then homogenized using an ultrasonic mixer.

The dichloromethane was removed from the dispersion under reduced pressure using a rotary evaporator.

The final properties of dispersions made according to Examples 3–9 are given in Table 2.

TABLE 2

| Example | TOTAL SOLIDS (%) | pH | VISCOSITY (mPa · s) | PARTICLE SIZE AVERAGE (µm) |
|---|---|---|---|---|
| 3 | 33.3 | 4.8 | 22.8 | 0.6 |
| 4 | 30.0 | 4.5 | 15.4 | 0.6 |
| 5 | 30.0 | 4.6 | 16.0 | 0.4 |
| 6 | 31.3 | 4.1 | 12.3 | 1.5 |
| 7 | 30.4 | 4.8 | 17.2 | 0.4 |
| 8 | 33.5 | 5.2 | 14.6 | 0.9 |
| 9 | 28.0 | 5.2 | 15.5 | 1–2 |

All of these dispersions were stable as produced. Dispersions of Examples 3–8 were stable over an extended period of time.

The proportion of Resin A used as the stabilizer in these preparations was 12.5 parts of polymer to 100 parts of rosin on a dry basis.

EXAMPLE 10 mixtures of rosin dispersion and alum containing equal parts of 30% T.S. ("total solids") dispersed rosin and 30% T.S. alum were prepared off machine and used to size bleached kraft (equal parts of softwood and hardwood) at levels of 0.45% and 0.6% dry basis addition.

In parallel runs for comparison in this and various examples following, two different aminopolyamide/epichlorohydrin resins designated herein as Resins B and C were used. As used, these resins were provided in aqueous solutions of 12.5±0.5 wt. % and ±0.3 wt. % (respectively) and are characterized by a weight of 1.03 kg/l, and a freezing point of −1° C.; Resin B is further characterized by a Brookfield viscosity of 50±20 cP (25° C.), a pH of 4.8±1.2, and nitrogen (dry basis, Kjedahl) of 12.8%; and Resin C is further characterized by a Brookfield viscosity of 50±10 cP (25° C.), a pH of 2.5±0.2, a nitrogen (dry basis) of 12.8, and a residual epichlorohydrin content of less than 0.1 ppm.

The sizing efficiency was measured with a Hercules size tester and the results are given in Table 3.

TABLE 3

| Size Dispersion Stabilizer | Addition Levels % Dry Basis | | | Sizing Efficiency (seconds) |
|---|---|---|---|---|
| | Rosin | Resin Stabilizer | Alum | |
| Resin A | 0.2 | 0.025 | 0.225 | 30 |
| Resin B | 0.2 | 0.025 | 0.225 | 17 |
| Resin A | 0.2667 | 0.0333 | 0.3 | 74 |
| Resin B | 0.2667 | 0.0333 | 0.3 | 51 |

EXAMPLE 11

Example 10 was repeated with an addition of alum, made on machine, equal in parts by weight to the alum already in admixture with the dispersed rosin. The addition levels of the various components and the sizing efficiency results are Given in Table 4.

TABLE 4

| Size Dispersion Stabilizer | Addition Levels (% dry basis) | | | | Sizing Efficiency (seconds) |
|---|---|---|---|---|---|
| | Rosin | Stabilizer | Alum In Size | Alum Machine Added | |
| Resin A | 0.2 | 0.025 | 0.225 | 0.225 | 44 |
| Resin B | 0.2 | 0.025 | 0.225 | 0.225 | 26 |
| Resin A | 0.2667 | 0.0333 | 0.3 | 0.3 | 72 |
| Resin B | 0.2667 | 0.0333 | 0.3 | 0.3 | 49 |

EXAMPLE 12

Sizing efficiency was measured with Resin A stabilized rosin dispersion, compared with sizing using Resin C resin stabilized rosin dispersion, with all the alum added separately on machine. The furnish was of bleached kraft (equal parts of softwood and hardwood) and was sized at pH 6.0. These results are given in Table 5 for addition levels given in percent dry basis.

TABLE 5

| SIZE DISPERSION STABILIZER | ADDITION LEVELS | | | SIZING EFFICIENCY (seconds) |
|---|---|---|---|---|
| | ROSIN | STABILIZER | ALUM | |
| Resin A | 0.444 | 0.056 | 0.25 | 129 |
| Resin C | 0.444 | 0.056 | 0.25 | 72 |
| Resin A | 0.444 | 0.056 | 0.5 | 130 |
| Resin C | 0.444 | 0.056 | 0.5 | 74 |
| Resin A | 0.444 | 0.056 | 1.0 | 109 |
| Resin C | 0.444 | 0.056 | 1.0 | 68 |

EXAMPLE 13

Example 5 was repeated using a sizing pH of 7.0, the results of which are given in Table 6 ("% d.b." connotes percent addition on a dry basis).

TABLE 6

| SIZE DISPERSION STABILIZER | ADDITION LEVELS % d.b. | | | SIZING EFFICIENCY (seconds) |
|---|---|---|---|---|
| | ROSIN | STABILIZER | ALUM | |
| Resin A | 0.711 | 0.089 | 0.4 | 79 |
| Resin C | 0.711 | 0.089 | 0.4 | 67.5 |
| Resin A | 0.711 | 0.089 | 0.8 | 106 |
| Resin C | 0.711 | 0.089 | 0.8 | 64 |
| Resin A | 0.711 | 0.089 | 1.6 | 124 |
| Resin C | 0.711 | 0.089 | 1.6 | 75.5 |

EXAMPLE 14

Sizing, with different levels of Resin A and Resin C resin stabilized rosin dispersions, was carried out using bleached kraft (equal parts softwood and hardwood) at pH 6.5. These results are given in Table 7.

TABLE 7

| SIZE DISPERSION STABILIZER | SIZE LEVELS % d.b. | | | SIZING EFFICIENCY (seconds) |
|---|---|---|---|---|
| | ROSIN | STABILIZER | ALUM | |
| Resin A | 0.4 | 0.05 | 0.9 | 66 |
| Resin C | 0.4 | 0.05 | 0.9 | 29 |
| Resin A | 0.622 | 0.078 | 1.4 | 138 |
| Resin C | 0.622 | 0.078 | 1.4 | 109 |
| Resin A | 0.756 | 0.094 | 1.7 | 173 |
| Resin C | 0.756 | 0.094 | 1.7 | 153 |

EXAMPLE 15

The efficiency of Resin A and Resin C resin stabilized rosin adduct (8% fumaric acid-fortified) dispersions were compared using a mixed furnish at pH 6.5 which comprised equal parts of bleached kraft (hardwood and softwood, 50/50) and groundwood; sizing efficiency results are shown in Table 8. Vacuum assisted drainage results at various sizing addition levels were also examined, the results being shown in Table 9.

TABLE 8

| SIZE DISPERSION STABILIZER | ADDITION LEVELS % d.b. | | | SIZING EFFICIENCY (seconds) |
|---|---|---|---|---|
| | ROSIN | STABILIZER | ALUM | |
| Resin A | 0.8 | 0.1 | 1.8 | 84 |
| Resin C | 0.8 | 0.1 | 1.8 | 47 |

TABLE 9

| Vacuum assisted drainage results | | | |
|---|---|---|---|
| Sizing Level and Parameters | | Resin B | Resin A |
| 0.15% d.b. | ΔP | 421 | 481 |
| | PS % | 38.8 | 37.0 |
| | Time | 23.6 | 17.7 |
| 0.20% d.b. | ΔP | 481 | 521 |
| | PS % | 37.5 | 36.1 |
| | Time | 18.5 | 16.9 |
| 0.257% d.b. | ΔP | 476 | 517 |

TABLE 9-continued

| Sizing Level and Parameters | | Vacuum assisted drainage results | |
|---|---|---|---|
| | | Resin B | Resin A |
| 0.37% d.b. | PS % | 39.1 | 36.6 |
| | Time | 20.4 | 16.5 |
| | ΔP | 486 | 528 |
| | PS % | 39.7 | 36.5 |
| | Time | 18.4 | 16.4 |

ΔP is the pressure drop in vacuum in millibars; PS % is weight percentage pulp pad solids; and Time is the drainage time in seconds. Improvements in drainage are evidenced in comparatison by higher pressure drops (ΔP), lower pad solids (PS %), and shorter drainage times.

As further evidence of the benefits achieved by using the novel polyamines at a higher pH, drainage rates were tested at a pH of 7.0, the results of which are shown in Table 10.

TABLE 10

| Schopper Riegler drainage results at pH 7.0 | | |
|---|---|---|
| WATER VOLUME | TIME (seconds) | |
| COLLECTED (ml) | Resin A | Resin C |
| 200 | 2.31 | 2.43 |
| 250 | 5.02 | 5.45 |
| 300 | 8.50 | 8.40 |
| 350 | 11.65 | 12.09 |
| 400 | 16.26 | 16.77 |
| 450 | 21.37 | 22.11 |
| 500 | 27.23 | 28.80 |
| 550 | 33.58 | 36.26 |
| 600 | 41.28 | 44.91 |
| 650 | 50.75 | 56.16 |
| 700 | 61.11 | 69.27 |

Shorter drainage times are evidence of improvements in drainage.

EXAMPLE 16

Zeta potential measurements of dispersed rosin adduct particles (8% fumaric acid-fortified) at pH's 5, 6, and 7, as stabilized with both Resin C resin and Resin A are given in Table 11. Zeta potention is measured in dilute'solution, similar to dilution levels present existing during commercial sizing operations.

TABLE 11

| DISPERSION | ZETA POTENTIAL (mV) at pH | | |
|---|---|---|---|
| STABILIZER | 5.0 | 6.0 | 7.0 |
| Resin C | 38.8 | 34.3 | 11.2 |
| Resin A | 50.0 | 45.6 | 38.6 |

While the main utilities of the novel cationic polyamines of the invention as described herein are for drainage aids and stabilizers for rosin sizes, in the manufacture of paper and paperboard their use can include such functions as retention, flocculation, dye levelling, and imparting antistatic properties. Additionally, these resins and the compositions in which they are incorporated (such as rosin dispersions), can be provided both internally (i.e., provided in the furnish or applied to the wet laid sheet) and externally (i.e., applied to the dry paper product).

The foregoing descriptions and experimental results are meant to explain and demonstrate the invention, and are not intended to limit the invention to only those parameters specifically disclosed. Thus, upon perusing this specification, various modifications of the foregoing may become apparent, and such are intended to be within the scope and spirit of the invention as defined by the following claims.

What is claimed is:

1. An aqueous dispersion comprising rosin particles and a cationic resin comprising a cross-linked polyamine having pendant tertiary and/or quaternary amine groups linked to amine groups in said polyamine by a hydrocarbon chain including a hydroxyl group in the β-position with respect to the polyamine chain.

2. An aqueous dispersion as claimed in claim 1 in which the polyamide is selected from the group consisting of polyalkylene polyamines, polyamidoamines, poly(diallylamine) and derivatives thereof, mixtures thereof, and modifications thereof with compounds or polymers containing urea, amine, imine, epoxide, acrylate, carboxylate, unsaturated acids, and mixtures thereof.

3. An aqueous dispersion as claimed in claim 2 in which the polyamine is the reaction product of diethyltriamine and adipic acid.

4. An aqueous dispersion as claimed in claim 3 in which the cationic resin comprises the reaction product of a polyamine having secondary amine groups, a cross-linking agent capable of reacting with said secondary amine groups, and a cationizing agent having an epoxide group and a tertiary or quaternary amine group or a precursor thereof.

5. An aqueous dispersion as claimed in claim 4 in which the polyamine is selected from the group consisting of polyalkylene polyamines, polyamidoamines, poly (diallylamine) and derivatives thereof, mixtures thereof, and modifications thereof with compounds or polymers containing urea, amine, imine, epoxide, acrylate, carboxylate, unsaturated acids, and mixtures thereof.

6. An aqueous dispersion as claimed in claim 5 in which the polyamine is a polyalkylene polyamine or a polyamidoamine.

7. An aqueous dispersion as claimed in claim 6 in which the polyamine is the reaction product of diethylenetriamine and adipic or glutaric acid or an ester thereof.

8. An aqueous dispersion as claimed in claim 4, wherein the crosslinking agent is selected from the group consisting of α,ω-alkane dihalides, ω,ω'-dihalogenoethers, halohydrins and epihalohydrins, bis-epoxide compounds, unsaturated compounds having at least two ethylenically unsaturated mutually non-conjugated double bonds, sulfonic acid esters of alkanediols, 2-halocarboxylic acid halides, and compatible mixtures thereof.

9. An aqueous dispersion as claimed in claim 8, wherein the crosslinking agent is selected from the group consisting of α,ω-alkane dihalides, epihalohydrins, bis-epoxide compounds, and sulfonic acid esters of α,ω-alkane diols.

10. The aqueous dispersion as claimed in claim 9, wherein the crosslinking agent is selected from the group consisting of 1,2-dichloroethane, epichlorohydrin, 1,4-butanediol diglycidyl ether, 1,4-butanediol di-p-toluenesulfonate, and mixtures thereof.

11. The aqueous dispersion as claimed in claim 10, wherein the cationizing agent is a quaternary amine defined by formula (X):

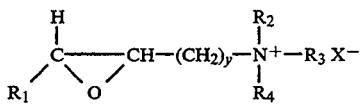

wherein: $R_1$ is H or $C_{1-3}$ alkyl; $X^-$ is an anion selected from the group consisting of chloride, bromide, acetate, and sulfate; $R_2$, $R_3$, and $R_4$ are independently $C_{1-8}$ alkyl; and y is 1–3.

12. The aqueous dispersion as claimed in claim 11, wherein the cationizing agent is glycidyltrimethylammonium chloride.

13. An aqueous dispersion comprising rosin particles and the cationic resin as defined by claim 1.

14. The dispersion as defined by claim 13, wherein the dispersed rosin particles have an average size in the range of 0.4–2 μm.

15. The dispersion as defined by claim 14, wherein the dispersed rosin particles have an average size in the range of 0.6–1.5 μm.

16. The dispersion as defined by claim 13, wherein the rosin is fortified.

17. The dispersion as defined by claim 16, wherein the rosin is fortified with 2–14% of a fortifying agent selected from the group consisting of fumaric acid, maleic acid, anhydrides thereof, and mixtures thereof.

18. The dispersion as defined by claim 13, further comprising alum.

19. A sizing agent comprising the dispersion defined by claim 13.

20. The sizing agent defined by claim 19, wherein the dispersed rosin particles have an average size in the range of 0.4–2 μm.

21. The sizing agent defined by claim 20, wherein the dispersed rosin particles have an average size in the range of 0.6–1.5 μm.

22. The sizing agent defined by claim 21, wherein the rosin is fortified.

23. The sizing agent defined by claim 22, wherein the rosin is fortified with 2–14% of a fortifying agent selected frown the group consisting of fumaric acid, maleic acid, anhydrides thereof, and mixtures thereof.

24. The sizing agent defined by claim 23, further comprising alum.

* * * * *